US006234718B1

United States Patent
Moffitt et al.

(10) Patent No.: US 6,234,718 B1
(45) Date of Patent: May 22, 2001

(54) VIBRATORY APPARATUS

(75) Inventors: John M. Moffitt, Wichita; Emory L. Frey, Clearwater, both of KS (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/280,123

(22) Filed: Mar. 26, 1999

(51) Int. Cl.[7] .............................. F16H 33/10; F16H 37/00
(52) U.S. Cl. ........................ 405/182; 405/271; 405/303; 172/40; 74/87; 173/49
(58) Field of Search .................................. 405/182, 271, 405/303; 404/117, 133.05, 133.02; 172/40; 74/87; 173/49; 175/55

(56) References Cited

U.S. PATENT DOCUMENTS

| | | | |
|---|---|---|---|
| 3,363,423 | * 1/1968 | Davis | 405/182 |
| 3,627,056 | 12/1971 | Rogers | 172/10 |
| 4,087,982 | 5/1978 | Golobay | 405/182 |
| 4,211,121 | * 7/1980 | Brown | 74/87 |
| 4,241,615 | 12/1980 | Ryan | 74/61 |
| 4,265,130 | * 5/1981 | Vural et al. | 74/87 |
| 4,440,034 | * 4/1984 | Waschulewski | 74/61 |
| 4,577,995 | 3/1986 | Sadahiro | 404/117 |
| 4,586,847 | 5/1986 | Stanton | 404/117 |
| 4,927,289 | * 5/1990 | Artberger | 404/117 |
| 5,039,252 | * 8/1991 | Schuermann | 405/182 |
| 5,163,336 | * 11/1992 | Biondetti | 74/87 X |
| 5,355,964 | * 10/1994 | White | 173/1 |
| 5,388,469 | * 2/1995 | Woltering | 74/61 |
| 5,580,234 | * 12/1996 | Wadensten | 418/181 |
| 5,752,571 | * 5/1998 | Sapozhnikov | 173/206 |
| 5,806,610 | * 9/1998 | Sapozhnikov | 173/206 |

* cited by examiner

Primary Examiner—David Bagnell
Assistant Examiner—Tara L. Mayo
(74) Attorney, Agent, or Firm—Jansson, Shupe & Munger, Ltd.

(57) ABSTRACT

A vibratory apparatus, useful with a vibrated plow, cable layer or the like, includes a housing and a shaft mounted to the housing for rotation about a shaft axis. Counterrevolving first and second eccentric weights are supported by the shaft for rotation about such axis. A drive gear is fixed with respect to the shaft and another drive gear is fixed with respect to the second weight. A transition gear engages both drive gears for counter-rotation of the weights about the same axis of rotation. Most preferably, the weights are configured to "interdigitate" as the shaft and weights rotate. That is, as the weights rotate in opposite directions, the first weight passes through a cavity in the second weight. The drive gears and the transition gear are preferably bevel gears and form what might be termed a differential gear set.

15 Claims, 7 Drawing Sheets

FIG. 1
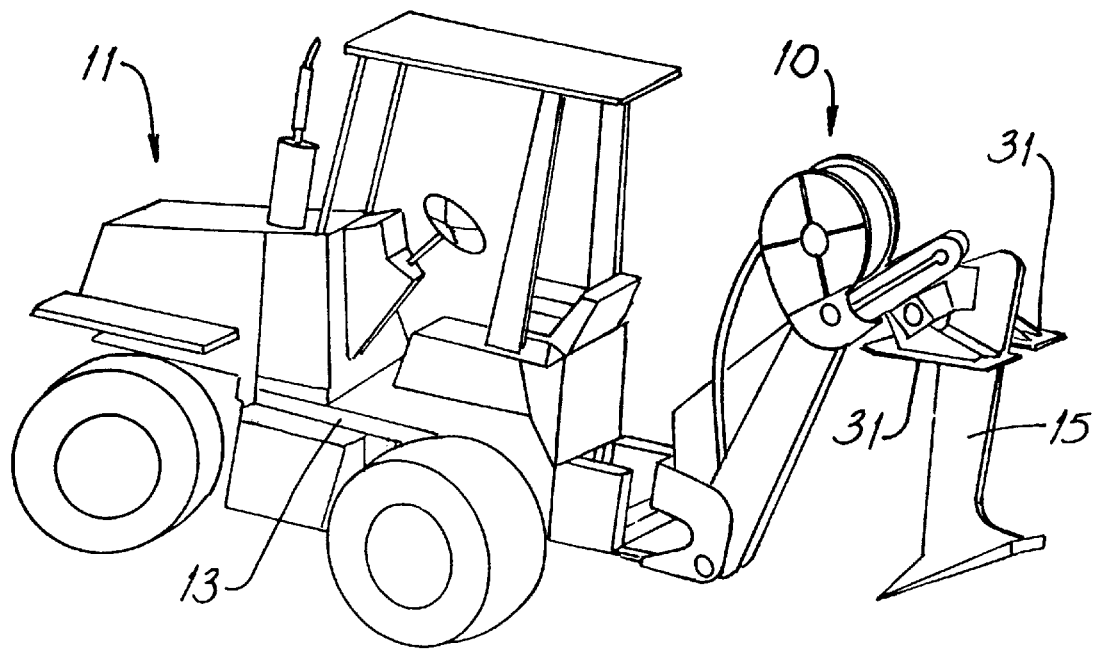
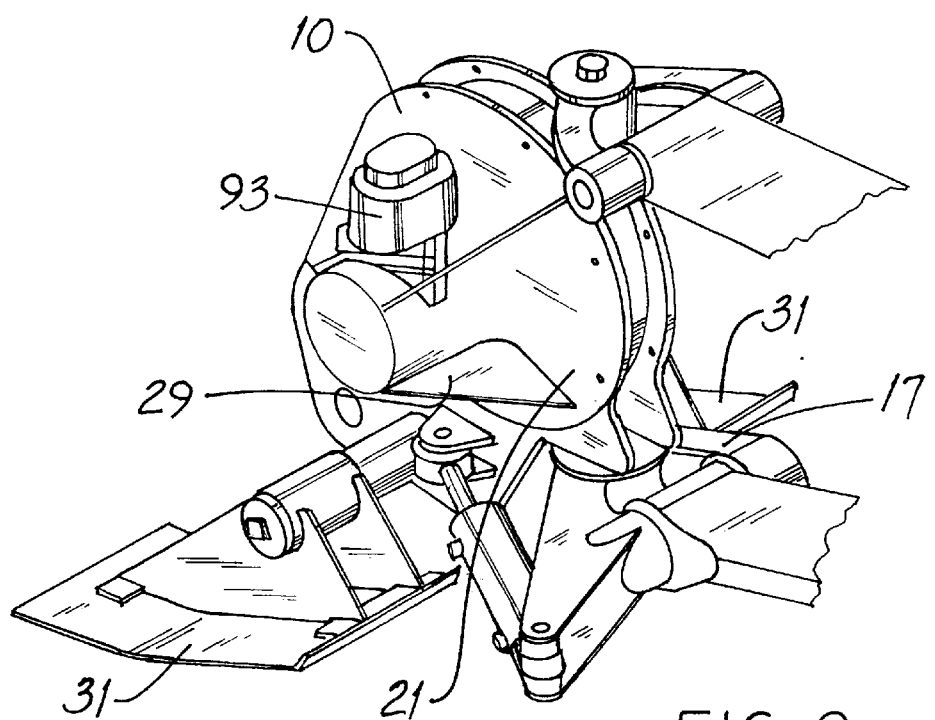
FIG. 2

VIBRATORY APPARATUS

FIELD OF THE INVENTION

This invention relates generally to hydraulic and earth engineering and, more particularly, to exemplary applications such as pipe and cable laying using a vibrating plow.

BACKGROUND OF THE INVENTION

Vibratory mechanisms find wide use in construction and other applications. An example of such an application is a road compacting machine of the type having a cylindrical drum which rolls over freshly laid asphalt and which vibrates to compact the asphalt into a relatively hard surface suitable for vehicular traffic. An example of such a machine and a vibratory drum used therewith are disclosed in U.S. Pat. No. 4,577,995 (Sadahiro). And another example of a vibratory drum used for road compaction is disclosed in U.S. Pat. No. 4,586,847 (Stanton).

Road compaction represents but one way in which vibratory mechanisms are used. Such mechanisms also find utility in soil tillage. U.S. Pat. No. 3,627,056 (Rogers) discloses a multi-blade plow pulled by a farm tractor. The blades are vibrated by a rotating eccentric weight.

And as disclosed in U.S. Pat. No. 4,087,982 (Golobay), vibratory plows are used for underground placement (within a trench) of flexible cables, flexible pipelines and the like. Such placement is often referred to as "laying" a cable or pipeline.

Vibrating the plow blade results in a number of advantages including reduced disturbance of the earth, faster placement of the cable or pipeline and reduced drawbar pull, i.e., reduced force required to draw the blade through the earth. The benefits of reduced earth disturbance and faster installation are apparent. For a given plow blade, reduced drawbar pull can translate into reduced engine or vehicle size or, alternatively, into increased placement speed.

In many respects, the vibratory mechanism disclosed in the Golobay patent typifies the type of mechanism used with plows for underground placement. Such mechanism includes two eccentric weights, each affixed to a separate shaft. One of the weights is split into spaced-apart halves and the other weight passes between the halves as the weights rotate. Weight rotation is by direct motor drive to one of the shafts and by a belt, or other mechanized methods, to the second shaft; both shafts rotate in the same direction. But double-shaft-mounted weights which are gear-driven in opposite directions are also known.

While vibratory mechanisms of, for example, the type disclosed in the Golobay patent, have been generally satisfactory for the intended purposes, they are not without disadvantages. One disadvantage is that they are structurally large. This is so because the mechanism housing must be very sturdy to withstand the vibration and because the housing must be sufficiently large to accommodate two spaced shafts and their respective weights.

A related disadvantage is that they are heavy. And increased weight is often attended by increased manufacturing cost of the vibratory mechanism itself and by the need to "beef up" the supporting framework.

Yet another disadvantage relates to the way in which a vibratory cable-laying plow is sometimes used, namely, adjacent to building foundations or walls. A known type of mechanism (such as that disclosed in the Golobay patent) has a very significant lateral dimension, i.e., a dimension measured perpendicular to the plow direction of travel. This prevents the plow from being used as close to a building wall as it might otherwise be.

Still another disadvantage relates to productivity. For a given vehicle engine size, the energy available to do useful work, i.e., draw the plow through the earth, operate a cable reel or the like, diminishes as the size and weight of the vibratory mechanism and its supporting framework increase.

An improved vibratory apparatus which addresses disadvantages of earlier mechanisms would be an important technological advance.

OBJECTS OF THE INVENTION

It is an object of the invention to provide an improved vibratory apparatus which overcomes some of the problems and shortcomings of earlier vibratory mechanisms.

Another object of the invention is to provide an improved vibratory apparatus which has reduced size and weight compared to mechanisms of similar capability.

Another object of the invention is to provide an improved vibratory apparatus which helps increase productivity.

Another object of the invention is to provide an improved vibratory apparatus which is particularly useful for vibratory plows. How these and other objects are accomplished will become apparent from the following descriptions and from the drawings.

SUMMARY OF THE INVENTION

The new vibratory apparatus includes a housing and a shaft mounted with respect to the housing for rotation about the shaft long axis. First and second eccentric weights are supported by the shaft, also for rotation about the shaft axis.

More specifically, the first weight is affixed to the shaft so that such weight and shaft rotate in unison and in the same direction, i.e., a first direction which may be clockwise or counterclockwise. The second weight is mounted in such a way that it rotates on the shaft in a second direction opposite that of the first direction. The first weight and the second weight are in periodic rotational registry during each revolution of the shaft and in a specific embodiment, such weights are in rotational registry twice for each revolution of the shaft.

In other aspects of the invention, a first drive gear is fixed with respect to the shaft; that is, such first drive gear and the shaft rotate in unison and at the same rotational speed. A second drive gear is fixed with respect to the second weight and, most preferably, is formed as a part of such weight. The first and second drive gears are axially spaced from one another.

At least one transition gear engages the drive gears and in one embodiment, there are two such transition gears located 180° from one another. (Most preferably, the drive gears and the transition gear(s) are bevel gears and resemble a differential gear set.)

When the shaft rotates, the first weight, the first drive gear and the shaft rotate in a first direction with respect to the shaft axis. The second weight and the second drive gear rotate on the shaft in a second direction about the shaft axis. Considering only the first drive and second drive gears, such gears rotate in opposite directions.

The transition gear rotates with respect to a respective axle-like rod and a rod axis. If the embodiment includes two transition gears, there are two such rods and two rod axes which are coincident with one another. And the rod and rod axis (or each rod and rod axis) is substantially perpendicular to the shaft axis. Like the first and second drive gears and for either direction of rotation of the main shaft (and assuming an embodiment with two transition gears), the first and second transition gears rotate in opposite directions about their respective rod axes.

In yet other aspects of the invention, the second weight includes a pair of axially-spaced weight members joined by a rib and defining a cavity between them. Such cavity has a cavity axial dimension, i.e., a dimension measured parallel to the main shaft long axis. The first weight has a first axial dimension less than the cavity axial dimension, thereby permitting the first weight to rotationally move in the cavity.

As to other details of the new apparatus, the housing comprises first and second dome-like closures and a ring-like central member interposed between the closures. Such closures bolt to opposite sides of the central member. While the first eccentric weight is affixed to the shaft for rotation therewith, the second eccentric weight is supported on the shaft by a first bearing set, thereby permitting the second weight to rotate independently of the shaft. The shaft and the weights comprise a rotating assembly and such assembly is supported in the housing by a second bearing set. The first bearing set includes a pair of axially-spaced first bearings and the second bearing set includes a pair of axially-spaced second bearings.

A motor is mounted with respect to the housing and has its motor output shaft coupled to the transition gear mentioned above. Both the first and second drive gears engage the transition gear. A pinion member is interposed between the transition gear and the shaft and is in releasable engagement with the shaft. In a highly preferred embodiment, the pinion member has a male spline end which engages female splines in the hollow shaft. And in such embodiment, the first drive gear is formed on and is an integral part of the pinion member.

Because the apparatus uses rotating metal parts which contact one another and because such apparatus generates a good deal of heat in operation, the housing contains lubricating oil to reduce friction and cool the parts. The shaft is hollow, thereby providing a shaft oil path. Similarly, the pinion member is hollow and includes a pinion oil path which is in flow communication with the shaft oil path. During apparatus operation, oil migrates along the paths.

Yet other aspects of the invention are set forth in the following detailed description and in the drawings.

BRIEF DESCRIPTIONS OF THE DRAWINGS

FIG. 1 is a representative perspective view showing the new vibratory apparatus in conjunction with a construction machine on which such apparatus may be used.

FIG. 2 is a representative perspective view showing the new vibratory apparatus in conjunction with certain apparatus mounting hardware, all as used on the machine of FIG. 1.

DETAILED DESCRIPTIONS OF PREFERRED EMBODIMENTS

Figure 3:
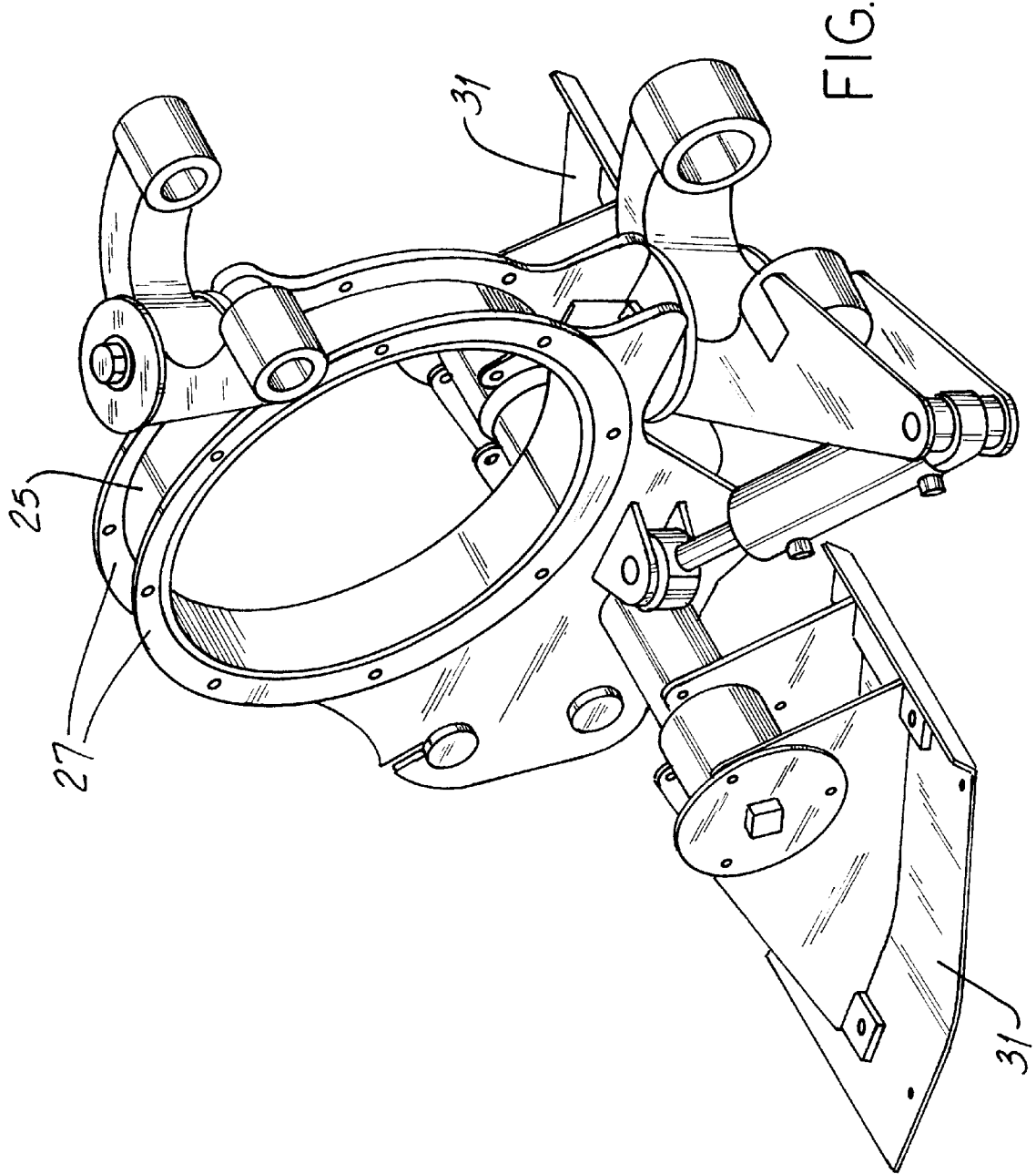
FIG. 3 is a perspective view of a portion of the housing of the new vibratory apparatus shown in conjuction with certain apparatus mounting hardware.

Before describing the new vibratory apparatus 10, it will be helpful to have an understanding of some aspects of an exemplary machine on which the apparatus 10 is used. FIG. 1 shows a construction machine 11, sometimes known as a tool carrier, having a chassis 13 with a vibratory plow 15 mounted at the rear.

Referring also to FIG. 2, the apparatus 10 is mounted on the plow frame 17 and as the plow 15 is drawn through the earth, the apparatus 10 vibrates it upwardly and downwardly. The advantages of vibrating the plow 15 are described above. Vibrating the plow 15 to cut through the earth is roughly analogous to using a knife with a "sawing" motion to slice bread.

Referring next to FIGS. 3, 4, 5 and 6, the new vibratory apparatus 10 includes a housing 19 comprising first and second dome-like closures 21 and 23, respectively, and a ring-like central member 25 interposed between the closures 21, 23. The member 25 includes a pair of opposed flanges 27 to which respective closures 21, 23 are bolted. Since operation of the apparatus 10 is attended by high forces and by stress on the housing 19, it is preferred that the closures 21, 23 be reinforced with ribs 29, gussets or the like.

The apparatus 10 is mounted to the frame 17 which supports the vibratory plow 15 below it. Considering FIGS. 1, 2 and 3, shoes 31 are pivotally attached to the frame 17 and slide along the surface of the earth as the plow 15 forms a "cut" through the earth.

The apparatus 10 includes a hollow main shaft 33 which rotates about its long axis 35. The first eccentric weight 37 is axially slide-mounted on to the shaft 33 and abuts a shaft shoulder 39 for weight positioning. Such weight 37 and the shaft 33 are affixed to one another by, e.g., a tapered bolt 41 extending into a tapered hole 43 in the shaft 33. Thus configured, the shaft 33 and the first weight 37 rotate in unison and in the same direction. A thrust bearing 45 is disposed adjacent to the weight.

Figure 7:
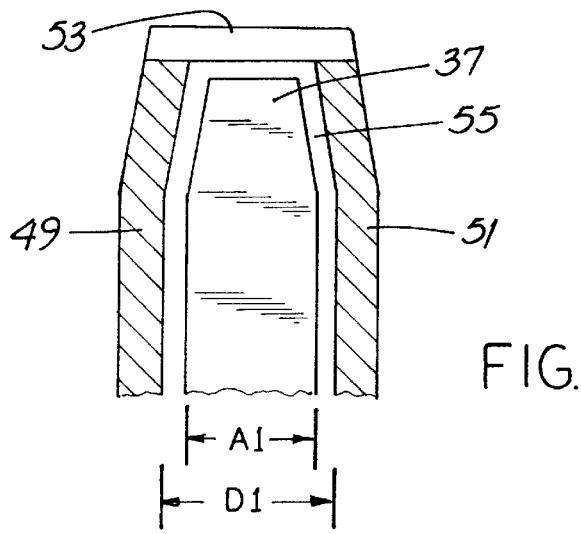
FIG. 7 is a representative view showing certain dimensional relationships of the vibratory apparatus.

The apparatus 10 also includes a second eccentric weight 47 comprised of first and second weight members 49, 51 respectively. Such weight members 49, 51 which otherwise would represent individual component parts, are rigidly joined together by plural plates 53 welded or otherwise affixed to the members 49, 51. The weight members 49, 51 are axially spaced from one another and define a cavity 55 between them. As represented by FIG. 7, the cavity 55 has a cavity axial dimension Dl, i.e., a dimension measured parallel to the main shaft long axis 35. The first weight 37 has a first axial dimension A1 which is less than the cavity axial dimension D1. When the weights 37, 47 are so configured, the first weight 37 may rotationally move in the cavity 55 without contacting either of the weight members 49, 51 or the plates 53.

In the exemplary embodiment, the second weight 47 is rotationally supported on the shaft by four bearings 57, 59, 61, 63. The bearings 57, 59, 61, 63 may be considered as first bearings and the bearings 57, 63 or the bearings 59, 61 may be considered as a first bearing set. By virtue of the bearings 57, 59, 61, 63 the second weight 47 and the shaft 33 are capable of rotation independently of one another and in opposite directions.

The shaft 33 and the weights 37, 47 comprise a rotating assembly and such assembly is rotationally supported in the housing 19 by the bearings 65, 67. Each bearing 65, 67 is interposed between a respective closure end bell 69 and the second weight 47. The bearings 65, 67 comprise a second bearing set.

Considering FIGS. 4 and 6, a second drive gear 71 (the first drive gear 75 is described below) is fixed with respect to the second weight 47. Most preferably, such gear 71 is formed (by machining or the like) as an integral part of such weight 47.

Figure 12:
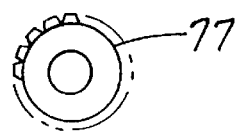

The apparatus 10 also includes a pinion member 73 which has a first drive gear 75 formed as an integral part thereof and in axial spaced relationship to the second drive gear 71. The pinion member 73 has a male end 77 which is in releasable, sliding-fit engagement with a female end 79 of the hollow shaft 33. Considering FIGS. 8, 9, 10 and 11, the male and female ends 77, 79 may assume any torque-transmitting shape, i.e., virtually any geometric shape other than round. A few examples include a rectangular shape 81, a hexagon shape 83, an elliptical shape 85, a keyed shape 87—with a key 89 and cut keyway 91—or the like. But in a highly preferred embodiment, such ends 77, 79 are splined as represented by the exemplary splined male end 77 of FIG. 12. From the foregoing, it is apparent that the pinion member 73 (including its first drive gear 75) and the shaft 33 must rotate in the same direction and at the same angular velocity, i.e., rotational speed.

A motor 93 is mounted to the housing 19 and has its motor output shaft 95 coupled to a transition gear 97 which engages both the first and second drive gears 75, 71. When considered from either end of the shaft 33 and for either direction of rotation of the transition gear 97, the first and second drive gears 75, 71 rotate in opposite directions.

Figure 6:
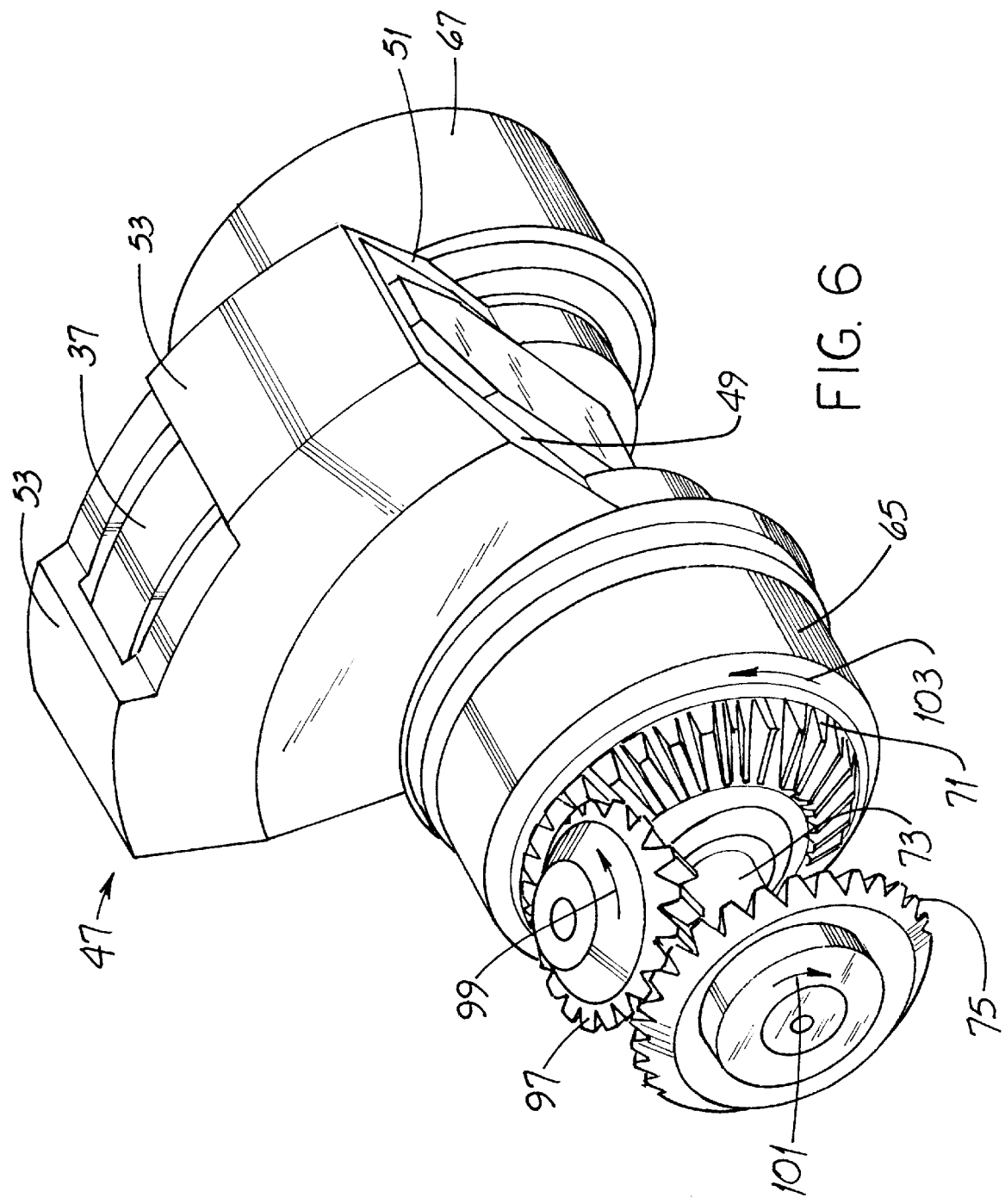
FIG. 6 is another perspective view of portions of the apparatus shown in FIG. 4.

For example, considering FIG. 6, if the transition gear 97 rotates in the direction indicated by the arrow 99, the first gear 75 rotates in the direction indicated by the arrow 101 and the second gear 71 rotates in the direction indicated by the arrow 103. And since, through the pinion member 73, the first gear 75 drives the shaft 33 and first weight 37 and since the second gear 71 drives the second weight 47, the weights 37, 47 rotate in opposite directions. (Persons familiar with machine elements will recognize that the gears 71, 75, 97 are bevel gears and that, together, such gears 71, 75, 97 bear a resemblance to a differential gear set.)

Figure 13:
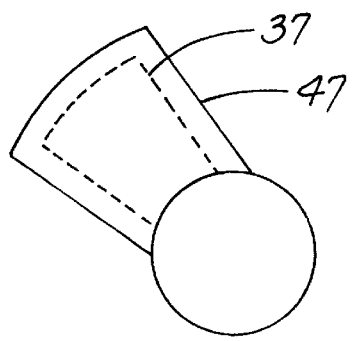
FIG. 13 is a representative view showing how the weights of the apparatus are in registry with one another at certain times during operation of the apparatus.
Figure 14:
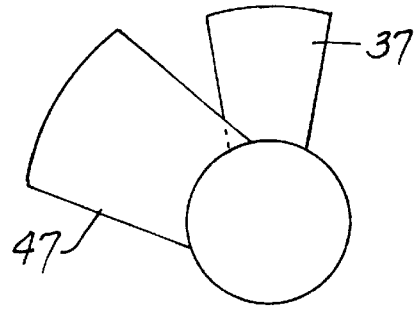
FIG. 14 is a representative view showing how the weights of the apparatus are out of registry with one another at other times during operation of the apparatus.
Figure 8:
FIGS. 8 through 12 are representative views showing different torque-transmitting shapes which are or may be used with components of the vibratory apparatus.
Figure 9:
Figure 10:
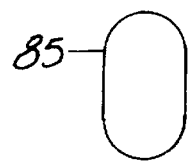
Figure 11:
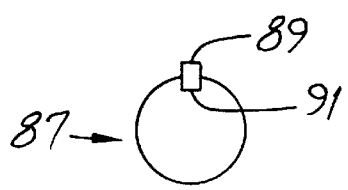

As represented by FIG. 13, the first weight 37 and the second weight 47 are in periodic rotational registry during each revolution of the shaft. In a specific embodiment, such weights 37, 47 are in rotational registry twice for each revolution of the shaft 33 and the "positions of registry" are 180° apart. As represented by FIG. 14, the weights 37, 47 are otherwise out of registry with one another.

Figure 4:
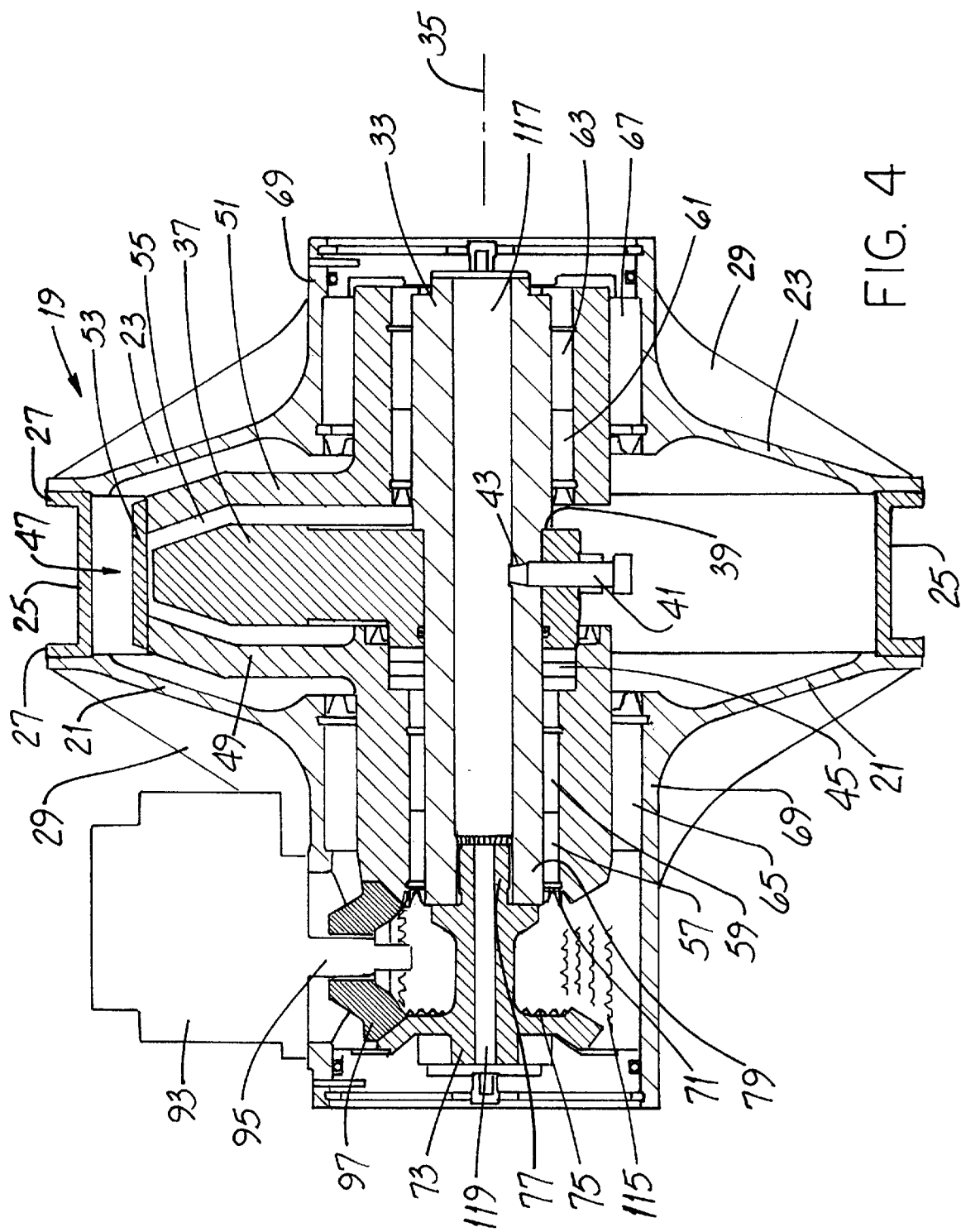
FIG. 4 is a cross-sectional elevation view of the new vibratory apparatus.
Figure 5:
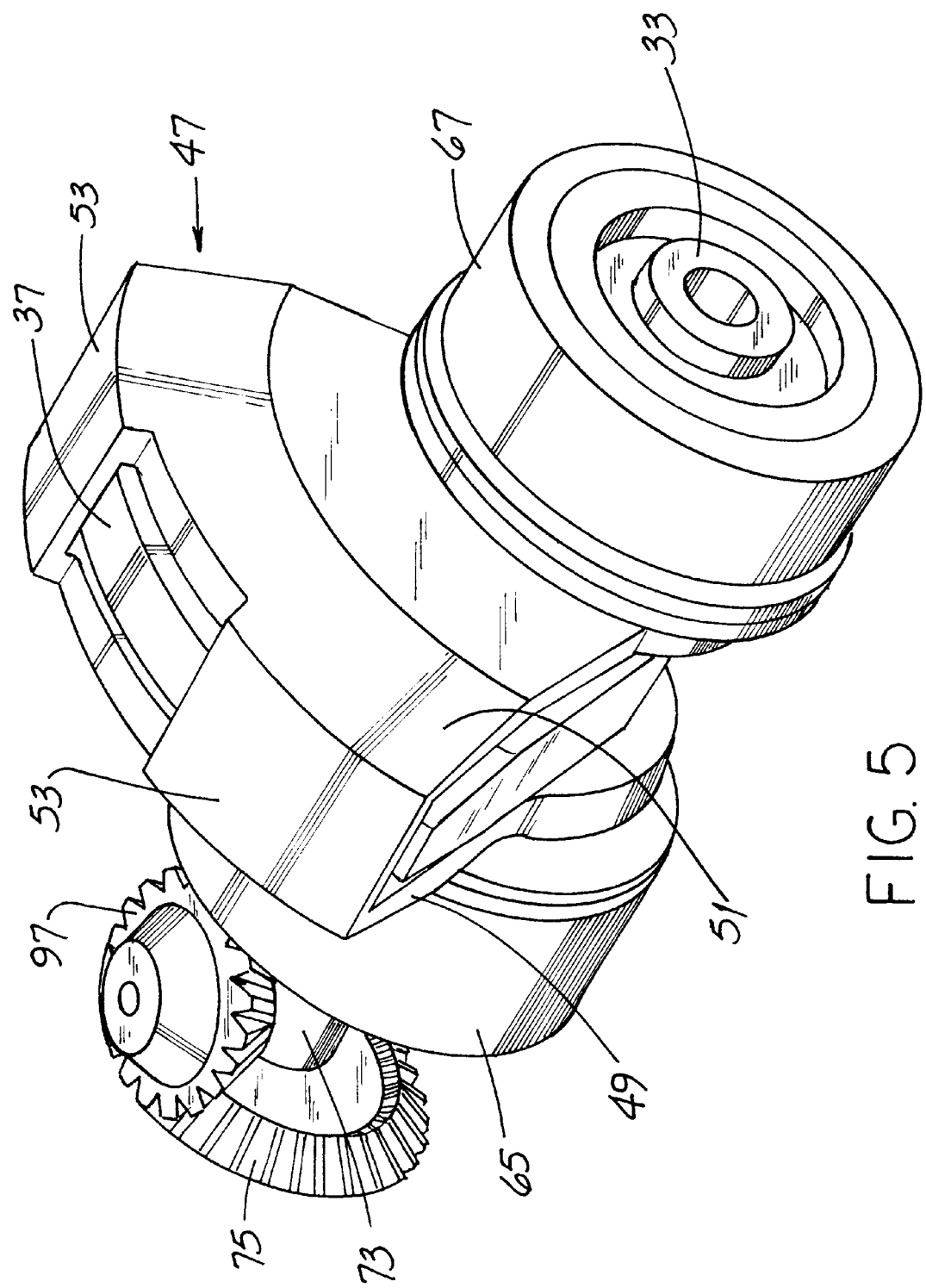
FIG. 5 is a perspective view of portions of the apparatus shown in FIG. 4.

Considering FIGS. 4, 5 and 6 and the foregoing description, it can now be appreciated that the "timing" of the apparatus 10 can be readily changed. If the transition gear 97 is disengaged from the gears 71, 75 such gears 71, 75 (and the weights 47, 37, respectively driven by them) can be relatively rotated with respect to one another to change timing in somewhat coarse increments. And if the apparatus 10 is further disassembled to permit withdrawal and reinsertion of the pinion member spline end 77 in the shaft 33 (at a different rotational location with respect to such shaft 33), a timing change in much smaller increments can be effected.

Figure 15:
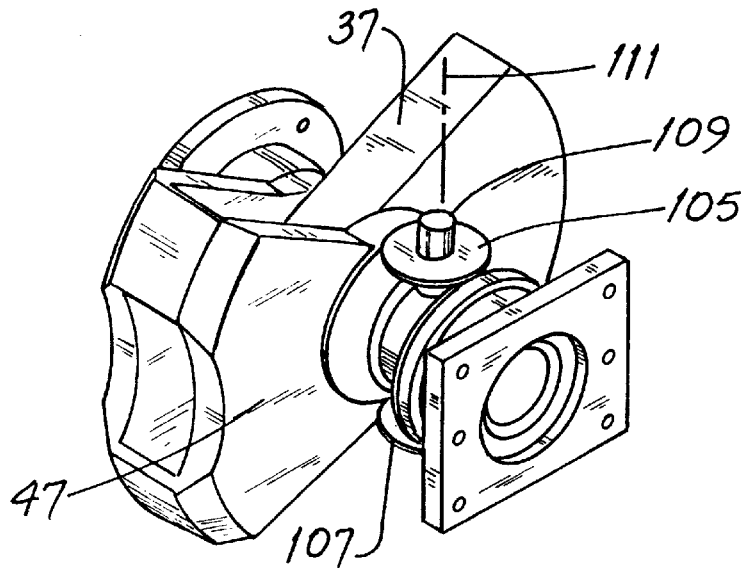
FIG. 15 is a perspective view of portions of another embodiment of the vibratory apparatus.
Figure 16:
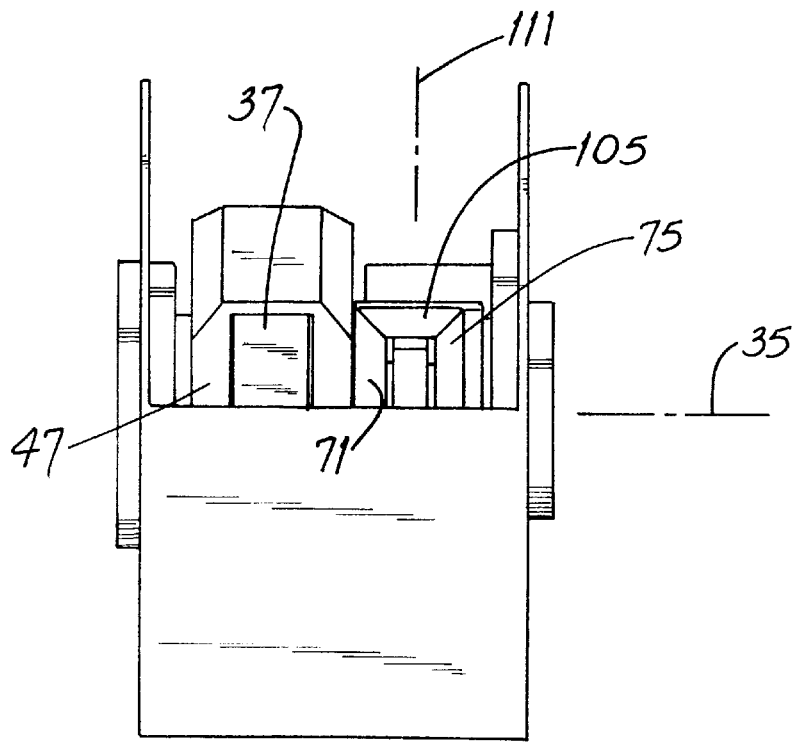
FIG. 16 is an elevation view of portions of the embodiment shown in FIG. 15.

Referring next to FIGS. 15 and 16, another embodiment of the apparatus 10 (shown without the housing 19) includes two transition gears 105, 107 located 1800 from one another. Each transition gear 105, 107 is rotatable with respect to an axle-like rod 109 and a rod axis 111. Transition gears 105, 107 mesh with and are driven by first drive gear 75 such that transition gears 105, 107 rotate in opposite directions about rod axis 111

It is contemplated to drive first drive gear 75 about shaft axis 35 by a motor 93 so as to rotate transition gears 105, 107. Transition gears 105, 107 mesh with second drive gear 71 such that rotation of transition gears 105, 107 in opposite directions about rod axis 111 drive second drive gear 71 about shaft axis 35 thereby driving second weight 47.

It is further contemplated to interconnect opposite ends of axle-like rod 109 to housing 19 such that the "timing" of apparatus 10 can be readily changed by rotating housing 19 about shaft axis 35. By rotating housing 19 about shaft axis 35, the positions at which weights 37, 47 are in rotational registry may be altered. By altering the "positions or registry" of weights 37, 47, it can be appreciated that the "timing" of apparatus 10 can be readily changed.

Referring again to FIG. 4, because the apparatus 10 uses rotating metal parts which contact one another and because such apparatus 10 generates a good deal of heat in operation, the housing 19 contains lubricating oil 115 to reduce friction and cool the parts. (Filling the housing 19 to about one-third to one-half full of lubricating oil 115 should be adequate.) The shaft 33 is hollow, thereby providing a shaft oil path 117. Similarly, the pinion member 73 is hollow and includes a pinion oil path 119 which is coextensive with and in flow communication with the shaft oil path 117. And such paths 117, 119 are coincident with the shaft axis of rotation. During apparatus operation, oil migrates along the paths 117, 119 to the end bells 69 and provides lubrication for the moving parts.

While the principles of the invention have been shown and described in connection with preferred embodiments, it is to be understood clearly that such embodiments are by way of example and are not limiting.

What is claimed:

1. A vibratory apparatus including:
    a housing;
    a shaft mounted with respect to the housing for rotation about a shaft axis;
    first and second eccentric weights supported by the shaft for rotation about the shaft axis;
    a first drive gear fixed with respect to the shaft; and
    a second drive gear fixed with respect to the second weight.

2. The apparatus of claim 1 wherein, when the shaft rotates, the drive gears rotate in opposite directions.

3. The apparatus of claim 1 wherein:
    the first weight is affixed to the shaft;
    the first weight, the shaft and the first drive gear rotate in a first direction; and
    the second weight and the second drive gear rotate on the shaft in a second direction.

4. The apparatus of claim 3 including a transition gear engaging the drive gears.

5. The apparatus of claim 4 wherein:

the transition gear rotates with respect to a rod; and the rod is substantially perpendicular to the shaft axis.

6. A vibratory apparatus including:

a housing;

a shaft mounted with respect to the housing for rotation about a shaft axis;

first and second eccentric weights supported by the shaft for rotation about the shaft axis;

a first drive gear fixed with respect to the shaft;

a second drive gear formed on the second weight and axially spaced from the first drive gear; and first and second transition gears engaging the drive gears.

7. The apparatus of claim 6 wherein:

the transition gears rotate about a rod axis; and the transition gears rotate in opposite directions.

8. A vibratory apparatus including:

a housing;

a shaft mounted with respect to the housing for rotation about a shaft axis;

first and second eccentric weights supported by the shaft for rotation about the shaft axis;

the second weight includes a pair of axially-spaced weight members joined by a rib and defining a cavity between the weight members;

the cavity has a cavity axial dimension; and the first weight has a first axial dimension less than the cavity axial dimension, thereby permitting the first weight to rotationally move in the cavity.

9. A vibratory apparatus including:

a housing comprising first and second closures and a central member interposed between the closures;

a shaft mounted in the housing for rotation about a shaft axis;

a first eccentric weight affixed to the shaft for rotation therewith;

a second eccentric weight supported on the shaft by a first bearing set, thereby permitting the second weight to rotate independently of the shaft;

a motor mounted with respect to the housing and having a motor shaft coupled to a transition gear;

a first drive gear fixed with respect to the shaft and engaging the transition gear;

a second drive gear fixed with respect to the second weight and engaging the transition gear; and wherein:

the shaft and the weights comprise a rotating assembly;

the rotating assembly is supported in the housing by a second bearing set.

10. The apparatus of claim 9 including:

a pinion member interposed between the transition gear and the shaft; and wherein the pinion member is in releasable engagement with the shaft.

11. The apparatus of claim 1 wherein:

the first drive gear is formed on the pinion member; and the pinion member and the shaft have corresponding torque-transmitting shapes and are in engagement with one another.

12. The apparatus of claim 11 wherein the pinion member and shaft are splined to one another.

13. The apparatus of claim 11 wherein:

the housing contains lubricating oil;

the shaft and the pinion member includes a shaft oil path and a pinion oil path, respectively; and the paths are in flow communication, thereby permitting oil to migrate therealong during operation of the apparatus.

14. A vibratory apparatus including:

a housing;

a shaft mounted with respect to the housing for rotation about a shaft axis;

first and second eccentric weights supported by the shaft for rotation about the shaft axis; wherein the first weight is affixed to the shaft and wherein the first weight and the shaft rotate in a first direction and the second weight rotates about the shaft in a second direction simultaneously with the first weight.

15. The apparatus of claim 14, wherein the first weight and the second weight are periodically in registry during each revolution of the shaft.

* * * * *

UNITED STATES PATENT AND TRADEMARK OFFICE
CERTIFICATE OF CORRECTION

PATENT NO. : 6,234,718 B1
DATED : May 22, 2001
INVENTOR(S) : John M. Moffitt and Emory L. Frey It is certified that error appears in the above-identified patent and that said Letters Patent is hereby corrected as shown below:

<u>Column 6,</u>
Line 11, cancel "1800" and insert -- 180° --.

Signed and Sealed this

Twenty-ninth Day of January, 2002

Attest:

Attesting Officer

JAMES E. ROGAN
*Director of the United States Patent and Trademark Office*